United States Patent [19]
Mathyssek et al.

[11] Patent Number: 4,556,292
[45] Date of Patent: Dec. 3, 1985

[54] OPTICAL POLARIZER HAVING A PRISM

[75] Inventors: Konrad Mathyssek, Zorneding; Hans Mahlein, Unterhaching, both of Fed. Rep. of Germany

[73] Assignee: Siemens Aktiengesellschaft, Berlin & Munich, Fed. Rep. of Germany

[21] Appl. No.: 464,586

[22] Filed: Feb. 7, 1983

[30] Foreign Application Priority Data

Feb. 19, 1982 [DE] Fed. Rep. of Germany ....... 3206040

[51] Int. Cl.$^4$ ............................................. G02B 27/28
[52] U.S. Cl. .................................... 350/394; 350/286
[58] Field of Search .............. 350/370, 377, 383, 390, 350/394, 395, 402, 286

[56] References Cited

U.S. PATENT DOCUMENTS

| | | | |
|---|---|---|---|
| 3,026,763 | 3/1962 | Marks | 350/395 |
| 3,564,450 | 2/1971 | Immarco et al. | 350/370 |
| 3,612,652 | 10/1971 | Habegger | 350/394 |

OTHER PUBLICATIONS

"Microoptic Grating Multiplexers and Optical Isolators for Fiber-Optic Communications," Kobayashi et al., IEEE Journal of Quantum Electronics, vol. QE-16, No. 1, Jan. 1980, pp. 11-22.

"Ein kontinuierlich einstellbarer Laserstrahl-Abschwacher aus dielektrischen Vielfacheschichten," Mahlein et al., Optic 38, vol. 2, 1973, pp. 187-195.

"Optics", Hecht et al., Addison-Wesley, 1974, p. 133.

"Zur Theorie der Abbildung einzelner Atome in dicken Objekten," Scherzer, Optik 38, vol. 4, 1973, pp. 387-405.

*Primary Examiner*—Bruce Y. Arnold
*Attorney, Agent, or Firm*—Hill, Van Santen, Steadman & Simpson

[57] ABSTRACT

An optical polarizer for an optical isolator has a dove prism having a selected geometric shape such that both the incident and emerging beams satisfy the Brewster condition at the respective entrance and exit faces. A further embodiment of the invention consists of the combination of two dove prisms with an intervening multiple layer. The polarizer can be easily adjusted with no reduction in the coupling efficiency with incoming light, can be manufactured inexpensively, and exhibits no parallel offset or astigmatism.

8 Claims, 2 Drawing Figures

OPTICAL POLARIZER HAVING A PRISM

BACKGROUND OF THE INVENTION

1. Field of the Invention

The present invention relates to an optical polarizer having a prism for an optical isolator.

2. Description of the Prior Art

Optical isolators are employed in optical communications technology for suppressing back-reflections of the optically transmitted flux in the direction back to the semiconductor laser used as a radiation source and/or transmitter. Such back-reflections may be caused, for example, by connectors, splices, discontinuites, and the like. Experiments have shown that the stability of the laser emission can be disrupted even when the difference between the emitted and the reflected radiant power is as low as 40 decibels.

Consequently, the isolation of the optical isolator must be as high as possible in order to achieve stable operation of the laser. Conventional optical isolators used for this purpose generally consist of a Faraday rotator placed between two polarizers crossed at 45° as described in the article "Microoptic Grating Multiplexers and Optical Isolators for Fiber-Optic Communications," K. Kobayashi and M. Seki, IEEE Journal of Quantum Electronics, Vol. QE-16, No. 1, January 1980, pages 11-22. In order for the optical isolator to achieve a high degree of isolation, the polarizer facing the semiconductor laser should not produce any back-reflections, and further should exhibit a high degree of polarization.

The use of such a device as an optical polarizer disposed at the input side of an optical isolator has already been proposed. Such a polarizer is in the form of a polarization beam splitter and consists of two prisms which are separated from one another by a multilayer dielectric structure. Such a proposal is described in the article "Ein Kontinuierlich Einstellbarer Laserstrahl-Abschwächer Aus Dielektrischen Vielfachschichten," by H. F. Mahlein and W. Rauscher, Optic 38, Vol. 2, 1973 pages 187-195.

SUMMARY OF THE INVENTION

It is an object of the present invention to realize a polarizer for an optical isolator which substantially eliminates parallel offset and/or astigmatism of the beam passing through it.

The above goal is inventively achieved in a polarizer consisting of at least one prism having a geometric shape such that a beam incident on an entrance face of the prism at an angle of incidence corresponding to Brewster angle and proceeding in the prism is incident on an exit face of the prism at an angle which is substantially identical to the angle of refraction at the entrance face of the prism.

With the polarizer disposed in the beam path such that the beam is incident on the entrance face of the prism at the Brewster angle, the prism functions as an polarizer which produces no back reflection and polarizes incident radiation in the plane of incidence and the beam, after departing the prism, propagates in the same direction as before entry into the prism. Due to total reflection in the prism, the beam also emerges from the prism at the same level at which it enters the prism, thereby achieving propagation of the beam through the prism with substantially no astigmatism.

In one embodiment of the invention, the entrance and exit faces of the prism are inclined relative to at least one total reflection face of the prism at an angle which is 90° minus the Brewster angle.

In another embodiment of the invention the prism may be a dove prism of the type described in "Optics," V. E. Hecht and A. Zajac, Addison-Wesley, 1974.

The polarizer may be more easily adjusted relative to the light source and to the Faraday rotator of the isolator when the beam, as it passes through the polarizer, exhibits neither a parallel offset nor astigmatism and the light coupling efficiency into the glass fiber following the isolator can also be thereby improved.

For use in applications wherein a small degree of polarization suffices, a single prism having total reflection and angular constancy under the Brewster condition may be utilized. Such a polarizer can be economically manufactured and sold.

If a high degree of polarization is required and the amount of polarization of a single prism having total reflection and angular constancy under the Brewster condition does not suffice for this purpose, two drove prisms may be utilized with an intervening dielectric multiple layer. The dielectric multiple layer considerably increases the degree of polarization.

DESCRIPTION OF THE PREFERRED EMBODIMENTS

Figure 1:
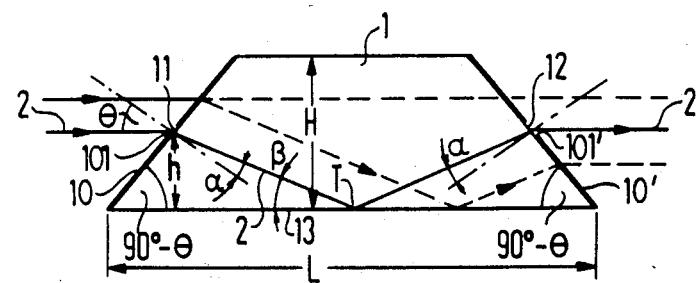
FIG. 1 is a side view of a polarizer constructed in accordance with the principles of the present invention in the form of a single dove prism having blackened entrance and exit faces.

A optical polarizer constructed in accordance with the principles of the present invention is shown in FIG. 1 in the form of a dove prism 1. The dove prism 1 has blackened lateral faces 11 and 12, one of the two lateral faces, for example, lateral face 11, forming a refractive entrance face for the prism 1, and the other lateral surface 12 forming a refractive exit face of the prism 1. The two lateral faces 11 and 12 are inclined at an angle $90° - \theta$ relative to the base surface 13, where $\theta$ is the angle of incidence of a beam 2 on the entrance face 11 measured relative to the normal of the entrance face 11. Thus the beam 2 is parallel to the base surface 13 and is retracted in the direction of the base surface 13. The beam is reflected from the base surface 13 in the direction of the exit face 12, and is refracted at the surface 12 such that the beam is propagated in the same direction as before entry into the prism 1.

If the incidence height h of the beam 2 measured from the base surface 13 is selected such that the location T at which the reflection occurs at the base surface 13 bisects the length of this surface (that is, T is the midpoint of the length L of the base surface 13) the beam will emerge at the same height at which it entered the prism 1. This means that the entering and emerging beams exhibit no parallel offset relative to one another and that substantially no astigmatism occurs.

In order to insure that light enters the prism 1 only at the proper incidence height h, at which neither parallel offset nor astigmatism occur, the entrance face 11 and the exit face 12 are respectively covered by masks 10 and 10'. The masks 10 and 10' have respective windows 101 and 101' in the form of a narrow strip at the incidence height h having a width which may be selected, for example, corresponding to the diameter of a laser beam.

The angle of inclination 90°−74, at which the entrance face 11 and the exit face 12 are inclined relative to the base surface 13, is selected such that the angle of incidence θ of the beam 2 is equal to the Brewster angle. By selecting the angle θ thusly, linearly polarized light P contained in the beam 2 and oscillating in the plane of incidence (the plane of the drawing of FIG. 1) is refracted free of reflections at the entrance face 11.

A prism having the properties described above can be constructed by means of the following relationships:

$$L = H (1/\tan 90° - \theta) + 1/\tan \beta)$$

$$\theta = \arctan n_p$$

$$\beta = \theta - \alpha$$

$$\alpha = \arcsin \left( \frac{n_i}{n_p} \sin \theta \right)$$

In the above equations, L is the length of the prism 1, H is the height of the prism 1, $n_p$ is the index of refraction of the prism material, and $n_i$ is the index of refraction of the medium surrounding the prism 1 or which is adjacent to the entrance face 11 and the exit face 12. The angles α and β are as shown in FIG. 1.

For a prism consisting of fused quartz having $n_p = 1.56$ and assuming air ($n_i = 1$) is the external medium, the beam 2 refracted at the entrance face 11 is incident on the base surface 13 at an angle (measured from the normal to the base surface 13) of $90° - \beta = 67.4°$. This angle is larger than the angle for total reflection which in this case is 41.8°. If the prism height H is selected H=2 mm, the length L for the prism is calculated to be 6 mm. The incidence height h=H/2 is then known. Due to the symmetrical structure of the prism 1, the Brewster condition is also met at the exit face 12, so that the beam 2 linearly polarized in the entrance plane departs from the prism 1 with no back-reflection. The elimination of the parallel offset between the entering and emerging beam simplifies adjustment of remaining optical components relative to one another. Parallel offset which would result if the beam 2 where incident on the entrance face 11 at other than the proper incidence height h is shown by the dashed lines.

Figure 2:
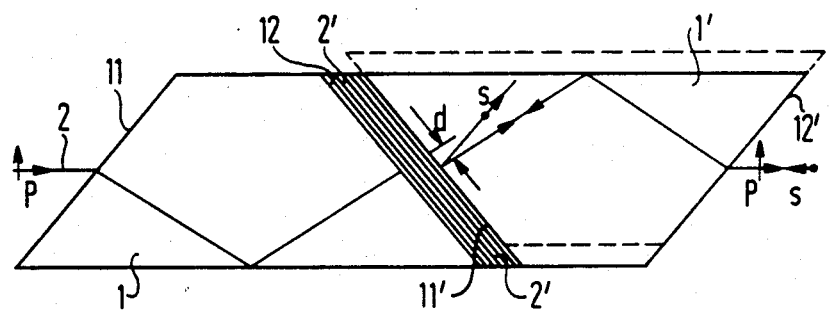
FIG. 2 is a further embodiment of a polarizer constructed in accordance with the principles of the present invention in the form of two dove prisms disposed next to each other in the direction of beam propagation separated by a multiple layer.

An optical polarizer having a high degree of polarization may be obtained by the use of a dielectric multiple layer, particularly by combining two dove prisms with the multiple layer enclosed therebetween, as shown in FIG. 2.

In the embodiment shown in FIG. 2, the dielectric multiple layer 2' is applied to the exit face 12 of the dove prism 1. A second dove prism 1', having an index of refraction identical to that of the dove prism 1, is joined to the multiple layer 2' such as, for example, by glueing. The multiple layer 2' may be applied by means of an adhesive layer with an index of refraction which is substantially identical to the prism 1.

The dielectric multiple layer 2' exhibits alternating low-refractive and high refractive layers. The materials comprising the layers are selected such that a low refractive layer has approximately the same index of refraction as the prism, and the index of refraction of the higher-refractive layer is selected at a value such that a beam incident upon the entrance face 11 of the prism at the Brewster angle strikes a higher-refractive layer at an angle which corresponds to the Brewster angle, which is determined by the index of refraction of the higher-refractive layer and the index of refraction of the prism or of the lower-refractive layer.

The layer thickness of the higher-refractive layers and the layer thickness of the lower-refractive layers are selected such that their effective optical layer thicknesses are equal to one-fourth of the wavelength of the incident beam 2.

Equations for calculating such a multiple layer are described, for example, in the above-identified article from "Optic 38." Such calculations are also identified in German patent application No. P3137442.5.

The dielectric multiple layer 2' of the polarizer shown in FIG. 2, however, causes a slight beam offset and a slight astigmatic difference. When these values are calculated for a multiple layer consisting of 13 alternating layers as dimensioned in German patent application No. P3137442.5 employed as in FIG. 2, a parallel offset d=2.5 μm and an astigmatic difference $d_a = 1.4$ μm results for a mean wavelength $\lambda_0 = 800$ mm and an adhesive layer thickness of 5 μm. These values are so small as to be ignored in the practical manufacture of a polarizer according to FIG. 2 which is to be employed for a multi-mode fiber link. These values may, however, if necessary be reduced or compensated for by means of offsetting the two prisms 1 and 1'. Such an offsetting is shown greatly exaggerated in FIG. 2 by dashed lines.

The polarizer shown in FIG. 2 exhibits a very high degree of polarization. If a polarizer having a low polarization degree is required, a single dove prism without the multiple layer, that is, a prism shown in FIG. 1, may be employed. Attenuation of the light s-polarized perpendicularly relative to the plane of incidence is in the range of 15% at the faces 11 and 12.

In terms of polarization behavior, the dove prism shown in FIG. 1 is equivalent to a thin plane-parallel plate which is positioned at the Brewster angle relative to a laser beam. Upon closer quantitative consideration, however, two disadvantages of such a plate are apparent, namely, astigmatism and parallel offset which are not inconsiderable. For example, a commercially available fused quartz plate having a thickness of 100 μm and an index of refraction of 1.46 exhibits a parallel offset d=0.5 mm and an astigmatic difference $d_a = 66$ μm. These values are not small enough to be ignored. Such a parallel offset and astigmatism exhibited by a fused quartz plate may be compensated by two parallel plates oppositely inclined at the Brewster angle, however, this arrangement is extremely difficult to adjust properly.

Although modifications and changes may be suggested by those skilled in the art it is the intention of the inventors to embody within the patent warranted hereon all changes and modifications as reasonably and properly come within the scope of their contribution to the art.

We claim as our invention:

1. An optical polarizer for an optical isolator for optical message transmission without feedback, said optical polarizer having at least one prism having an entrance face and an exit face with a total reflection face extending therebetween, said entrance face and said exit face being respectively inclined relative to said total reflection face at an angle which is 90 degrees minus the Brewster angle, and said prism having an optical geometry such that a beam incident on said entrance face at an angle corresponding to the Brewster angle proceeds through said prism and is reflected by said total reflection face to be incident on said exit face at an angle which is substantially identical to the angle of refraction at said entrance face.

2. The polarizer of claim 1 wherein said prism is a dove prism.

3. The optical polarizer of claim 1 further comprising a dielectric multiple layer having alternating lower and higher refractive index layers disposed adjacent to one of said exit or entrance faces of said prism, said lower refractive index layer in said multiple layer having an index of refraction substantially equal to the index of refraction of said prism.

4. The optical polarizer of claim 3 wherein the outer layer of said multiple layer disposed at the side facing away from said prism is a lower-refractive index layer.

5. The optical polarizer of claim 3 further comprising a second prism having an optical geometry substantially the same as said first mentioned prism and being disposed at a side of said multiple layer facing away from said first prism, said second prism having an entrance face adjacent to said multiple layer and having an index of refraction substantially equal to that of said first prism.

6. The optical polarizer of claim 5 wherein said first prism and said second prism are dove prisms.

7. The optical polarizer of claim 3 wherein said multiple layer is held adjacent to said prism by an adhesive layer having an index of refraction substantially identical to that of said prism.

8. The optical polarizer of claim 1 further comprising a radiation-impermeable mask having a window disposed at a selected height from a base of said prism for permitting transmission of radiation therethrough, said mask covering at least said entrance face of said prism.

* * * * *